(12) United States Patent
Henry et al.

(10) Patent No.: US 10,040,142 B2
(45) Date of Patent: Aug. 7, 2018

(54) VARIABLE POLARITY PULSE WITH CONSTANT DROPLET SIZE

(71) Applicant: Lincoln Global, Inc., City of Industry, CA (US)

(72) Inventors: Judah Henry, Geneva, OH (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1121 days.

(21) Appl. No.: 13/833,836

(22) Filed: Mar. 15, 2013

(65) Prior Publication Data

US 2014/0263241 A1  Sep. 18, 2014

(51) Int. Cl.
| | | |
|---|---|---|
| B23K 9/09 | (2006.01) | |
| B23K 9/095 | (2006.01) | |
| B23K 9/10 | (2006.01) | |
| B23K 9/173 | (2006.01) | |

(52) U.S. Cl.
CPC .............. *B23K 9/092* (2013.01); *B23K 9/095* (2013.01); *B23K 9/1043* (2013.01); *B23K 9/173* (2013.01)

(58) Field of Classification Search
CPC .......... B23K 9/09; B23K 9/092; B23K 9/095; B23K 9/10; B23K 9/1043; B23K 9/173
USPC .............. 219/130.1, 130.21, 130.31, 130.32, 219/130.33
See application file for complete search history.

(56) References Cited

U.S. PATENT DOCUMENTS

| | | |
|---|---|---|
| 2,085,402 A | 6/1937 | Vance |
| 3,598,954 A | 8/1971 | Iceland et al. |
| 3,679,866 A | 7/1972 | Arikawa et al. |
| 3,781,511 A | 12/1973 | Rygiol |
| 4,019,018 A | 4/1977 | Oishi et al. |
| 4,861,965 A | 8/1989 | Stava |
| 4,994,646 A | 2/1991 | Tabata et al. |
| 5,073,695 A | 12/1991 | Gilliland |
| 5,138,132 A | 8/1992 | Baurle et al. |

(Continued)

FOREIGN PATENT DOCUMENTS

| | | |
|---|---|---|
| EP | 890407 | 1/1999 |
| EP | 1439021 | 7/2004 |

(Continued)

OTHER PUBLICATIONS

International Search Report and Written Opinion from PCT/IB2014/000325 dated Nov. 7, 2014.

(Continued)

*Primary Examiner* — David Angwin
*Assistant Examiner* — Justin Dodson
(74) *Attorney, Agent, or Firm* — Calfee, Halter & Griswold LLP

(57) ABSTRACT

An electric arc welder including a high speed switching power supply with a controller for creating high frequency current pulses with negative polarity components through the gap between a workpiece and a welding wire advancing toward the workpiece. Molten metal droplets are quickly created during negative polarity portions of the weld cycle. Welding controls include integrating a parameter during the negative polarity portions to determine when a desired amount of energy has been generated at the welding wire. This energy is associated with a desired droplet size for consistent droplet transfers to the workpiece.

11 Claims, 13 Drawing Sheets

(56) References Cited

U.S. PATENT DOCUMENTS

| | | | |
|---|---|---|---|
| 5,643,479 A | 7/1997 | Lloyd et al. | |
| 5,667,709 A | 9/1997 | Ueyama et al. | |
| 6,031,203 A * | 2/2000 | Suzuki | B23K 9/073 219/130.01 |
| 6,225,598 B1 | 5/2001 | Nihei et al. | |
| 6,346,684 B1 | 2/2002 | Gabbianelli et al. | |
| 6,515,259 B1 | 2/2003 | Hsu et al. | |
| 6,621,037 B2 | 9/2003 | Gabbianelli et al. | |
| 6,683,278 B2 | 1/2004 | Stava et al. | |
| 6,689,982 B2 | 2/2004 | Gabbianelli et al. | |
| 6,713,707 B2 | 3/2004 | Gabbianelli et al. | |
| 6,870,132 B2 | 3/2005 | Stava | |
| 7,053,334 B2 | 5/2006 | Stava | |
| 7,166,818 B2 | 1/2007 | Stava et al. | |
| 7,271,365 B2 | 9/2007 | Stava et al. | |
| 7,705,270 B2 | 4/2010 | Norrish et al. | |
| 8,080,763 B2 | 12/2011 | Fujiwara et al. | |
| 8,124,913 B2 | 2/2012 | Artelsmair | |
| 2005/0006367 A1 * | 1/2005 | Dodge | B23K 9/1006 219/130.1 |
| 2006/0226131 A1 * | 10/2006 | Stava | B23K 9/093 219/130.33 |
| 2007/0210048 A1 | 9/2007 | Koshiishi et al. | |
| 2007/0221643 A1 * | 9/2007 | Narayanan | B23K 9/0008 219/137 R |
| 2007/0267393 A1 | 11/2007 | Dodge et al. | |
| 2008/0223840 A1 * | 9/2008 | Era | B23K 9/092 219/130.21 |
| 2010/0155383 A1 * | 6/2010 | Shiozaki | B23K 9/09 219/130.51 |
| 2011/0114615 A1 * | 5/2011 | Daniel | B23K 9/0953 219/137 R |
| 2012/0097655 A1 | 4/2012 | Daniel et al. | |
| 2012/0097656 A1 * | 4/2012 | Peters | B23K 9/091 219/130.51 |
| 2012/0118865 A1 * | 5/2012 | Stava | B23K 9/1006 219/130.31 |
| 2013/0015170 A1 | 1/2013 | Peters | |
| 2013/0112675 A1 | 5/2013 | Peters | |
| 2014/0008342 A1 | 1/2014 | Peters | |
| 2014/0076858 A1 | 3/2014 | Peters | |
| 2014/0083987 A1 | 3/2014 | Dodge et al. | |
| 2014/0083988 A1 | 3/2014 | Peters | |
| 2014/0251971 A1 | 9/2014 | Hearn et al. | |
| 2014/0263241 A1 | 9/2014 | Henry et al. | |

FOREIGN PATENT DOCUMENTS

| | | |
|---|---|---|
| EP | 1712320 | 10/2006 |
| EP | 1782907 | 5/2007 |
| JP | 58-176074 | 10/1983 |
| WO | 2014135954 A1 | 9/2014 |
| WO | 2014140748 A2 | 9/2014 |

OTHER PUBLICATIONS

International Search Report and Written Opinion from PCT/IB2014/000251 dated Aug. 12, 2014.
Office action from U.S. Appl. No. 13/788,486 dated May 26, 2015.
Response from U.S. Appl. No. 13/788,486 dated Aug. 26, 2015.
Office action from U.S. Appl. No. 13/788,486 dated Oct. 29, 2015.
Response from U.S. Appl. No. 13/788,486 dated Feb. 25, 2016.
Office action from U.S. Appl. No. 13/788,486 dated Apr. 29, 2016.
Response from U.S. Appl. No. 13/788,486 dated Jul. 14, 2016.
Notice of Allowance from U.S. Appl. No. 13/788,486 dated Oct. 4, 2016.
Office Action from Chinese Patent Application No. 201480026057.7 dated Jul. 26, 2016 (13 pages) (English Translation).
First Office Action from Chinese Patent Application No. 201480027990.6 dated Jul. 18, 2016 (English Translation attached) (25 Pages).

* cited by examiner

| WORKPOINT | RAMP UP TIME | PEAK TIME | PEAK AMP | RAMP DOWN TIME | NEG. AMP | JOULES | BACK-GROUND TIME | BACK-GROUND AMP | WFS |
|---|---|---|---|---|---|---|---|---|---|
| 100 | 1.4 | 0.6 | 400 | 2.5 | 35 | 0.8 | 9 | 30 | 100 |
| 200 | 1.3 | 0.6 | 405 | 2.3 | 50 | 1.0 | 4 | 70 | 200 |
| 300 | 1.2 | 0.6 | 410 | 2 | 60 | 1.0 | 3 | 100 | 300 |
| 400 | 1.1 | 0.7 | 420 | 1.5 | 75 | 0.8 | 2 | 125 | 400 |
| 500 | 1 | 0.7 | 460 | 1 | 75 | 1.2 | 1 | 150 | 500 |

US 10,040,142 B2

1

VARIABLE POLARITY PULSE WITH CONSTANT DROPLET SIZE

The present invention relates to the art of electric arc welding using a gas metal arc welding (GMAW) process and more particularly to a GMAW electric arc welder that creates a high frequency chain of pulses to form a series of weld cycles constituting a weld process.

INCORPORATION BY REFERENCE

The following patents include information related to the subject matter of the current application and are also incorporated by reference herein in full: U.S. Ser. No. 13/293,103, filed Nov. 9, 2011; U.S. Ser. No. 13/293,112, filed Nov. 9, 2011; U.S. Ser. No. 13/543,545, filed Jul. 6, 2012; U.S. Ser. No. 13/554,744, filed Jul. 20, 2012; U.S. Ser. No. 13/625,188, filed Sep. 24, 2012; and U.S. Ser. No. 13/788,486, filed Mar. 7, 2013.

BACKGROUND OF THE INVENTION

In electric arc welding, a popular welding process is pulse welding, which primarily uses a solid wire electrode with an outer shielding gas. Gas metal arc welding (GMAW), such as metal inert gas (MIG) welding, uses spaced pulses which first melt the end of an advancing wire electrode and then propel the molten metal from the end of the wire through the arc to the workpiece. A globular mass of molten metal or droplet is transferred during each pulse period of the pulse welding process.

SUMMARY OF INVENTION

Alternating current (AC) welding can include negative current during a negative polarity portion in the pulse waveform. The negative polarity portion can build a molten droplet on the end of the wire very quickly and can be difficult to control. Because adaptive control methods typically look at the long term running average of the waveform, regardless of the polarity, the size of any particular droplet can vary from cycle to cycle. The pulse peaks following the formation of the droplets must be large enough to transfer the largest possible droplet expected, even if the actual droplet is smaller. This condition can result in inconsistent droplet transfers, for example, with spattering, poor appearance, and excessive heat.

In one embodiment, an electric arc welder includes a high speed switching power supply with a controller for creating high frequency pulses through a gap between a workpiece and a welding wire advancing toward the workpiece, a wave shape generator to define a shape of the high frequency pulses and a polarity of the high frequency pulses, and wherein the wave shape generator senses feedback from an arc through the gap and ends a negative polarity portion when a function of the feedback reaches a predetermined value.

The descriptions of the invention do not limit the words used in the claims in any way or the scope of the claims or invention. The words used in the claims have all of their full ordinary meanings

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

DETAILED DESCRIPTION

Figure 1:
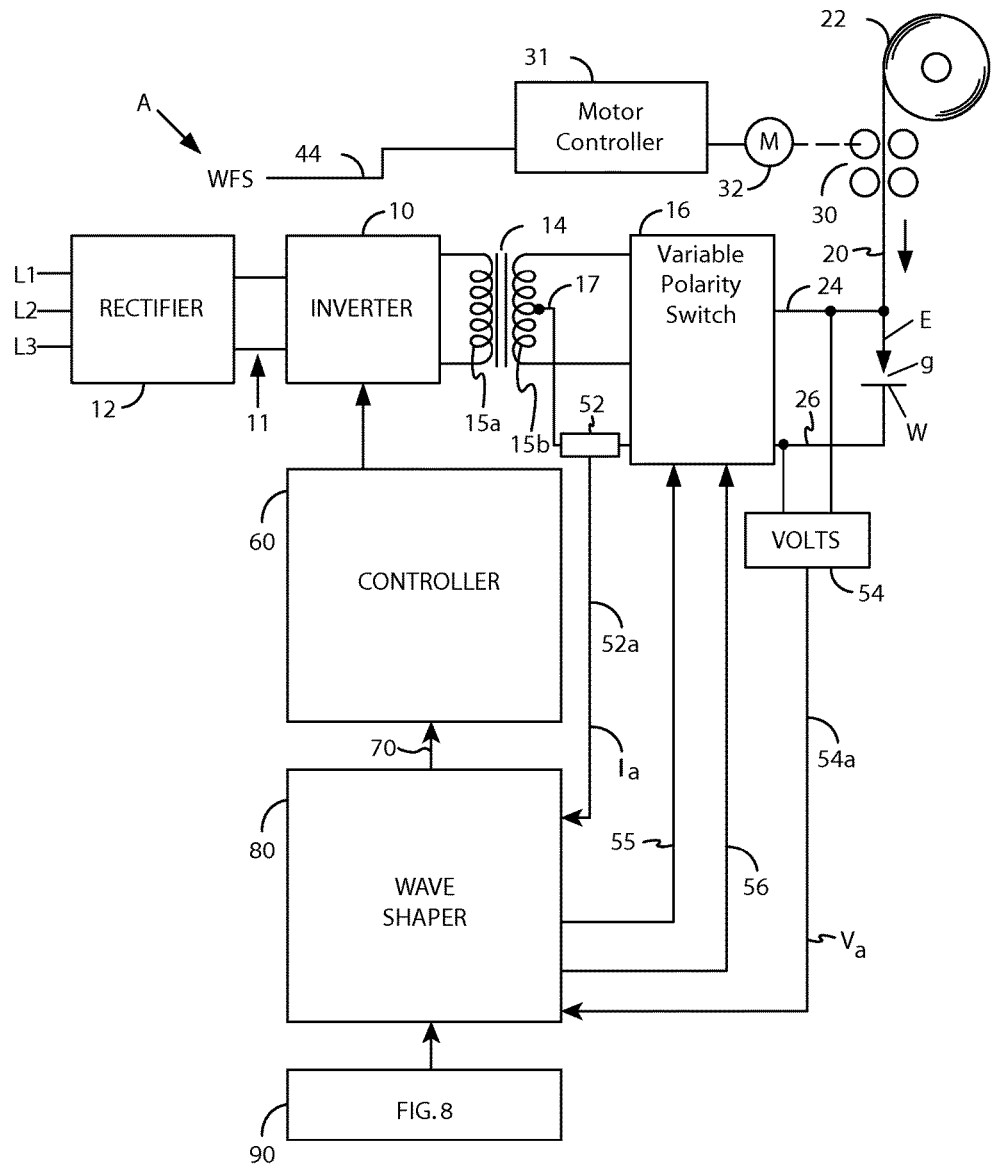
FIG. 1 is an exemplary combined block diagram and system architecture for an exemplary welder for performing an embodiment of the present invention.
Figure 2:
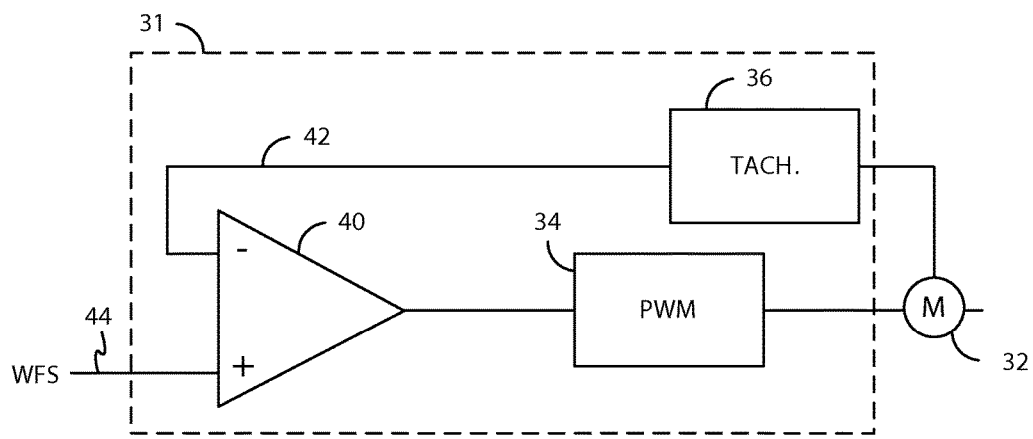
FIG. 2 is an exemplary circuit diagram of an exemplary motor controller in an embodiment of the present invention.

Referring now to the drawings, which are for the purpose of illustrating exemplary embodiments of the invention only and not for the purpose of limiting same, FIG. 1 discloses an exemplary welder A having a generally standard configuration, including a high speed switching power supply 10, such as an inverter or buck converter, with an input rectifier 12 and an output transformer 14 directing current pulses by way of a variable polarity switch 16 to an electrode E. In this embodiment, the power supply regulates the current of the pulses. However, in other embodiments, voltage or combinations of voltage and current may be regulated to define the high frequency pulses. An exemplary variable polarity switch 16 is described in more detail below in association with FIG. 3A. The electrode E includes a wire 20, such as an aluminum wire, from a spool or drum 22 and advanced by feeder 30 toward workpiece W through the action of motor 32. Motor 32 is controlled with a motor controller 31. An exemplary motor controller is shown in FIG. 2, where a pulse width modulator 34 controls the speed of motor 32 and thus feeder 30 under direction of a feedback tachometer 36 and an operational amplifier 40 for comparing input 42 from tachometer 36 with a command wire feed speed (WFS) signal in the form of a level on line 44. Other motor controllers 31 may also be used.

Referring back to FIG. 1, as the aluminum electrode or wire E advances toward workpiece W, an arc is created across gap g by a series of current pulses, which may include pulse peaks, a background current, and a negative polarity current.

Referring now to the exemplary power supply, the inverter stage includes a switching type inverter 10 provided with power from a three phase voltage source L1-L3 having a frequency of 50 or 60 Hz according to the local line frequency. The AC input voltage is rectified by rectifier 12 to provide a DC link 11 directed to the input of inverter 10. The output, or load of inverter 10 is transformer 14 having a primary winding 15a and secondary winding 15b with a center tap 17 connected to the workpiece W. Secondary winding 15b is directed to the variable polarity switch 16 to create output lines 24, 26 connected to electrode E and workpiece W.

Figure 3A:
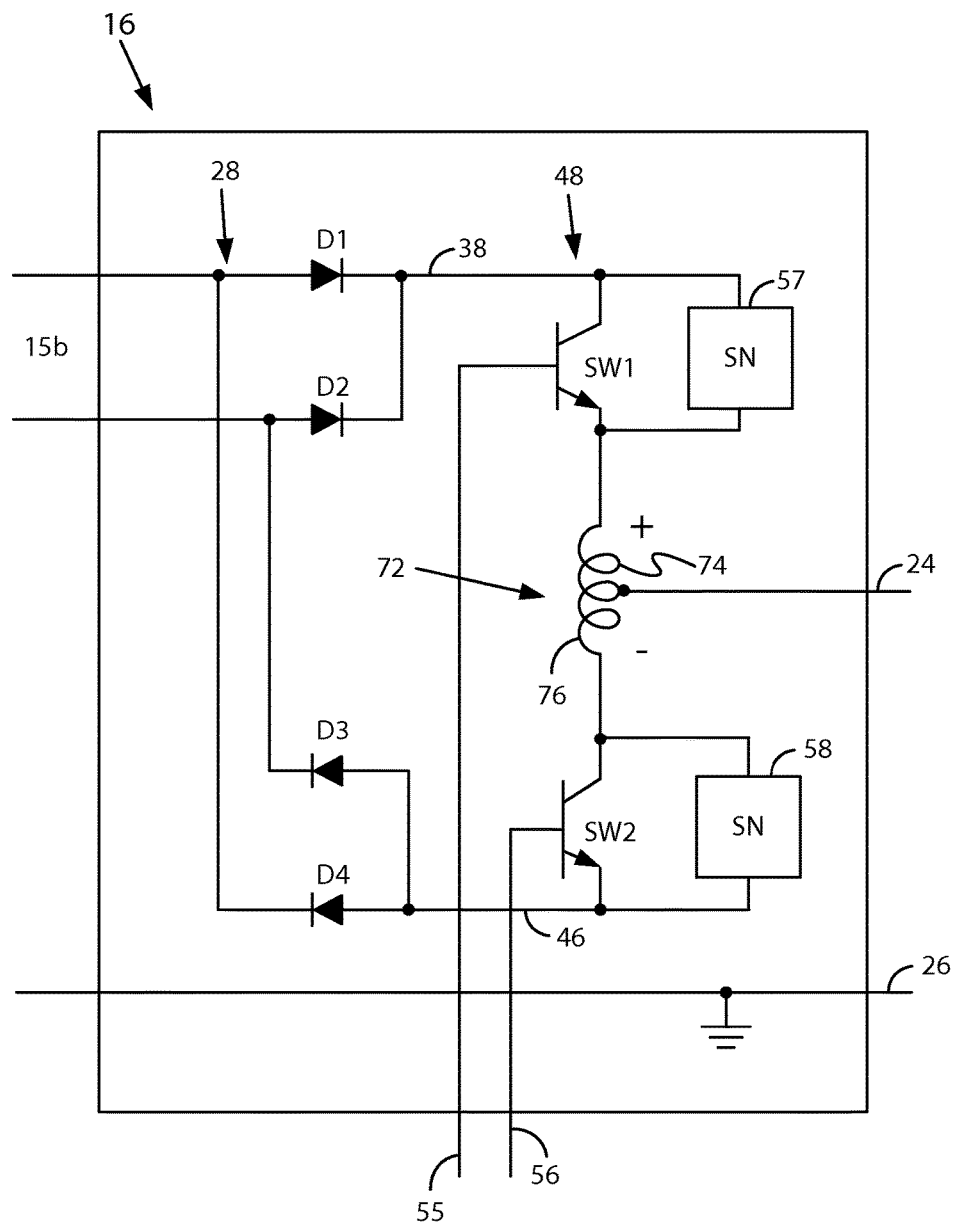
FIG. 3A is an exemplary circuit diagram of an exemplary variable polarity switch in an embodiment of the present invention.
Figure 3B:
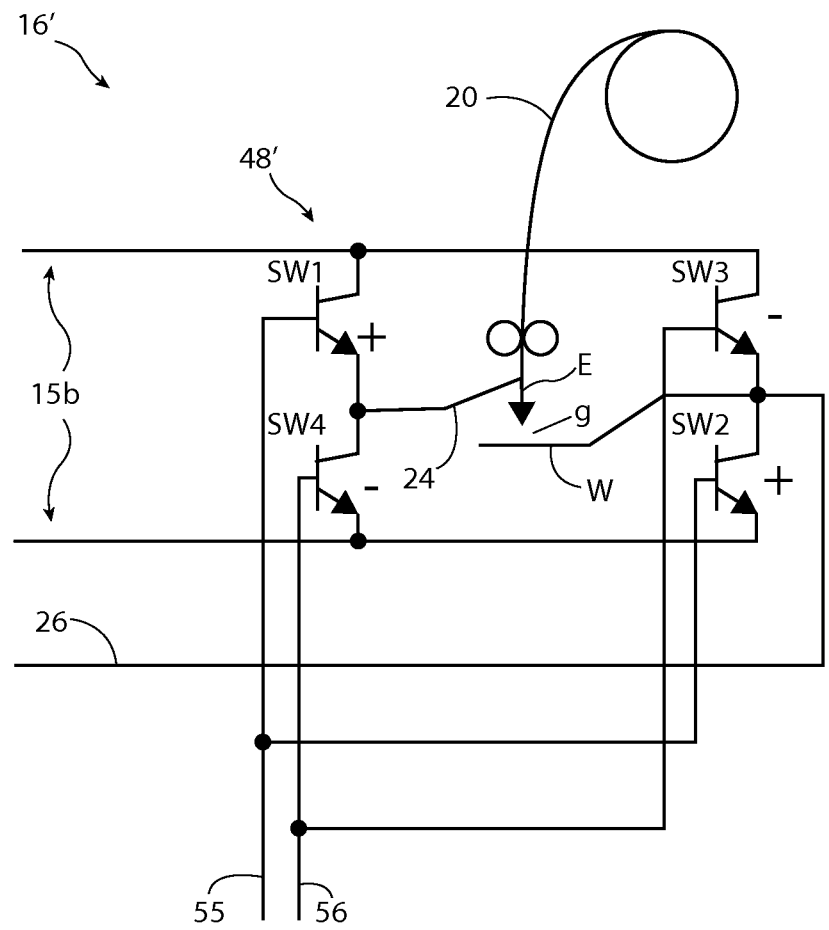
FIG. 3B is another exemplary circuit diagram of another exemplary variable polarity switch in an embodiment of the present invention.

The variable polarity switch 16 can be any switching device capable of switching polarity signals on output lines 24, 26, such as those described in U.S. Ser. No. 13/788,486, which is incorporated by reference herein in full. For example, FIG. 3A shows an exemplary variable polarity switch 16 with a positive rectifier circuit 28 having diodes D1, D2, D3 and D4 to create a positive output terminal 38 and a negative output terminal 46 connected to an output switching network 48. Output switching network 48 may include two transistor type switches SW1 and SW2, usually in the form of insulated-gate bipolar transistors (IGBTs) that can be turned on and off according to the logic on base lines 55, 56. To dissipate high voltages when switches SW1, SW2 are off, snubber networks 57, 58 are connected across the switches SW1, SW2. Other configurations of switching networks, such as, for example, switching network 48', as shown in FIG. 3B, and discussed below, may also be used. Network 48 can be used for pulsating high welding currents substantially over 200 amperes. A single output inductor 72 is divided into positive pulse section 74 and negative pulse section 76. In this manner, an AC current is created in output lines 24, 26 connected to electrode E and workpiece W. By alternating the logic on base control lines 55, 56 in succession, a high frequency alternating current is applied to the welding circuit including electrode E and workpiece W. The AC frequency is determined by the frequency at which the logic alternates on base control lines 55, 56. The logic on these lines may be generated by a software program or subroutine processed by a microprocessor in, for example, a wave shape generator or wave shaper 80, described in more detail below.

FIG. 3B shows another exemplary variable polarity switch 16' using a full wave bridge. Output switching network 48' may include four transistor type switches SW1, SW2, SW3, and SW4, that can be turned on and off according to the logic on base lines 55, 56. When SW1 and SW2 are on, the electrode E is positive; when SW3 and SW4 are on, the electrode E is negative. Network 48' can also be used for pulsating high welding currents substantially over 200 amperes. In this manner, an AC current is created in output lines 24, 26 connected to electrode E and workpiece W. By alternating the logic on base control lines 55, 56 in succession, a high frequency alternating current is applied to the welding circuit including electrode E and workpiece W. The AC frequency is determined by the frequency at which the logic alternates on base control lines 55, 56. The logic on these lines may be generated by a software program or subroutine processed by a microprocessor in, for example, a wave shape generator or wave shaper 80, described in more detail below.

Referring back to FIG. 1, arc current is read by sensor 52 to create a voltage signal in line 52a representing arc current $I_a$. In a like manner, arc voltage is sensed by sensor 54 to create a voltage signal on line 54a representing arc voltage $V_a$. In accordance with standard practice, processing devices, such as those represented as controller 60 and wave shaper or generator 80, are connected to power supply 10 to create pulses in accordance with the feedback current $I_a$ and/or voltage $V_a$. For example, controller 60 may include a pulse width modulator driven by an oscillator having a frequency exceeding 100 kHz. The pulse width modulator can produce a current pulse during each output of the oscillator. The pulse width determines the amplitude of the current pulse. The level of current during the welding cycle includes many pulses from the pulse width modulator.

As so far described, exemplary welder A is a welder with controller 60 and wave shaper 80 controlling the wave shape of the current pulses and wave shaper 80 and variable polarity switch 16 controlling switching and polarity, which both contribute to defining the welding cycle at gap g, which creates the welding arc. The controller 60 receives a command signal on line 70 from the wave shaper 80. The voltage on line 70 determines the profile, shape, and/or contour of the current pulses of the welding process. This configuration has been popularized by, for example, the Power Wave brand of welders from The Lincoln Electric Company, and in particular, for example, the Power Wave S350, S500, R350, R500, Super Glaze, Super Arc, and Blue Max.

Figure 8:
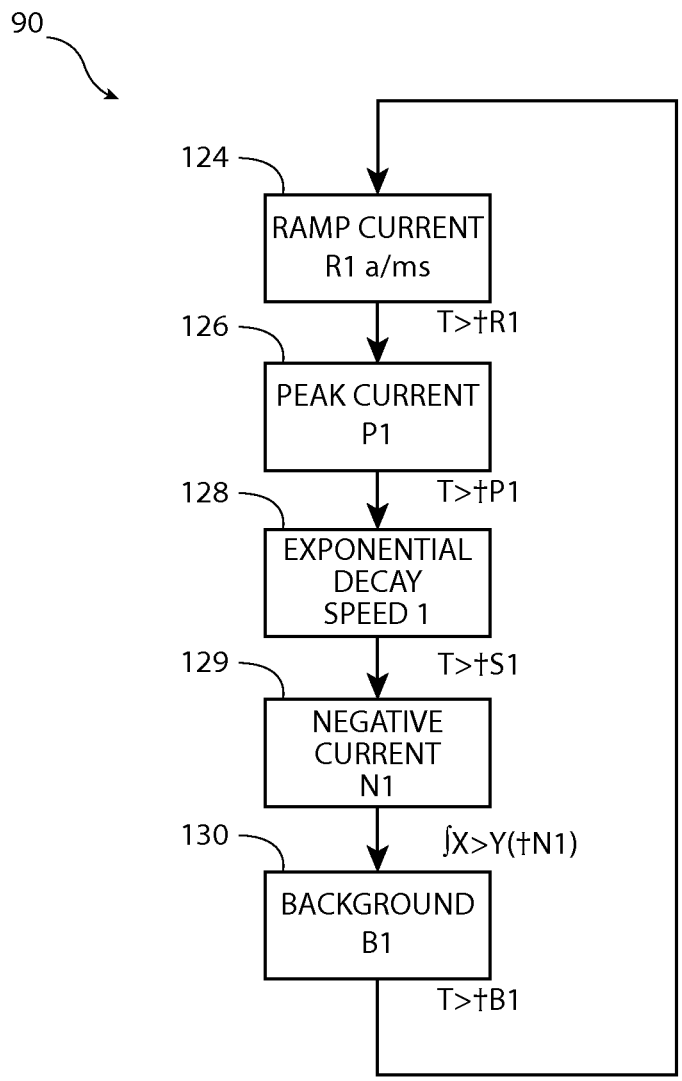
FIG. 8 is an exemplary logic diagram and flow chart to obtain exemplary high frequency pulses with exemplary features, including negative polarity components.

In accordance with the invention, wave shaper 80 controls the signal on line 70 to shape the high frequency pulses used in the welding process. Control logic 90, as shown in FIG. 8 and described in more detail below, repeatedly initiates logic, software, or a routine to create repeating weld cycles. In some embodiments, the wave shaper 80 may include the control logic 90, and any other logic that creates the desired waveform. As described above, to create the high frequency alternating current applied to the welding circuit across the electrode E and workpiece W, the wave shaper 80 controls the logic on control lines 55, 56 to create alternating polarity currents. Also, as mentioned above, in various embodiments, the high frequency pulses may be regulated by current, voltage, or combinations of voltage and current, including non-linear combinations.

Changing the polarity of portions of the pulses, between positive and negative, can allow for greater control of the heat created during welding. The arcs created by positive and negative polarity currents exhibit several differences during welding because the behaviors and characteristics of the cathode and the anode are not the same. In particular, during welding, the heat generated at the cathode and the heat generated at the anode are significantly different. When the polarity of the current is reversed (e.g., switched from positive to negative or from negative to positive), the anode and cathode are exchanged, which causes the heating characteristics of these regions to reverse.

Figure 4:
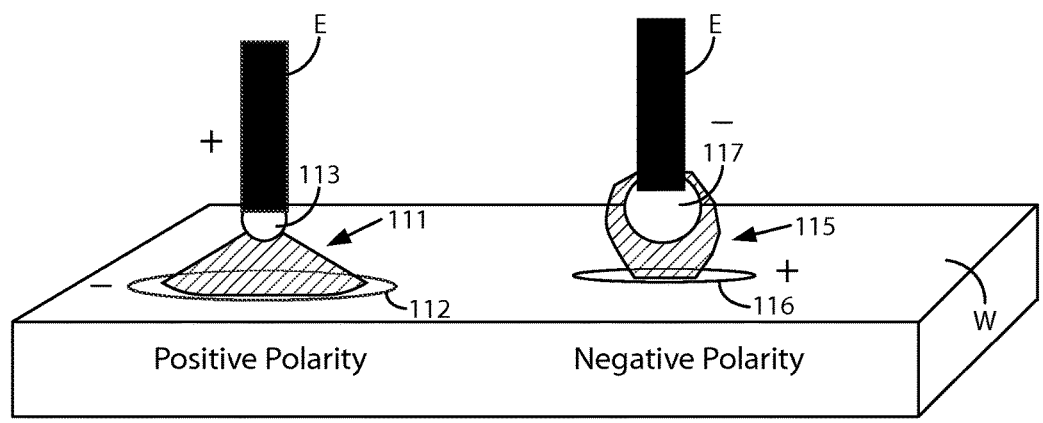
FIG. 4 is a drawing of exemplary welding arcs showing positive and negative polarity effects.

FIG. 4 is a drawing of exemplary welding arcs that highlights some of the differences between exemplary arcs during positive and negative polarity portions of the welding waveform or pulse wave. In general, although welding always adds heat to the workpiece W, negative polarity portions of the weld cycle add less heat to the puddle of the workpiece W than positive polarity portions. During a positive polarity portion, an arc 111 spreads across a puddle 112, heating up a wide area. On the positive electrode E side, the arc 111 is concentrated at the bottom of droplet 113. The current flows through the droplet 113 and its associated magnetic pinch force acts on the liquid droplet 113, thus eventually pulling it from the electrode E to the workpiece W. However, during a negative polarity portion, an arc 115 is concentrated on the center of a puddle 116, allowing the edges to cool off and start to solidify. On the negative electrode E side, the arc 115 covers much more of the end of the electrode E, heating up a large molten metal droplet 117. In this manner, much of the current does not flow through the droplet 117, and its associated pinch force is not applied to the liquid droplet 117, so it hangs at the end of the electrode E, getting bigger. This large liquid droplet 117 is transferred to the workpiece W with the next positive polarity pulse peak.

Negative polarity increases the burn-off rate of the electrode E as heat is built up in the electrode E, which also allows the weld puddle to cool off. Therefore, when the current has a positive polarity, most of the heat is dissipated or absorbed into the weld puddle of the workpiece W. When the current has a negative polarity, more of the heat is dissipated or absorbed into the electrode E, with much less heat dissipated into the weld puddle of the workpiece W.

Figure 5:
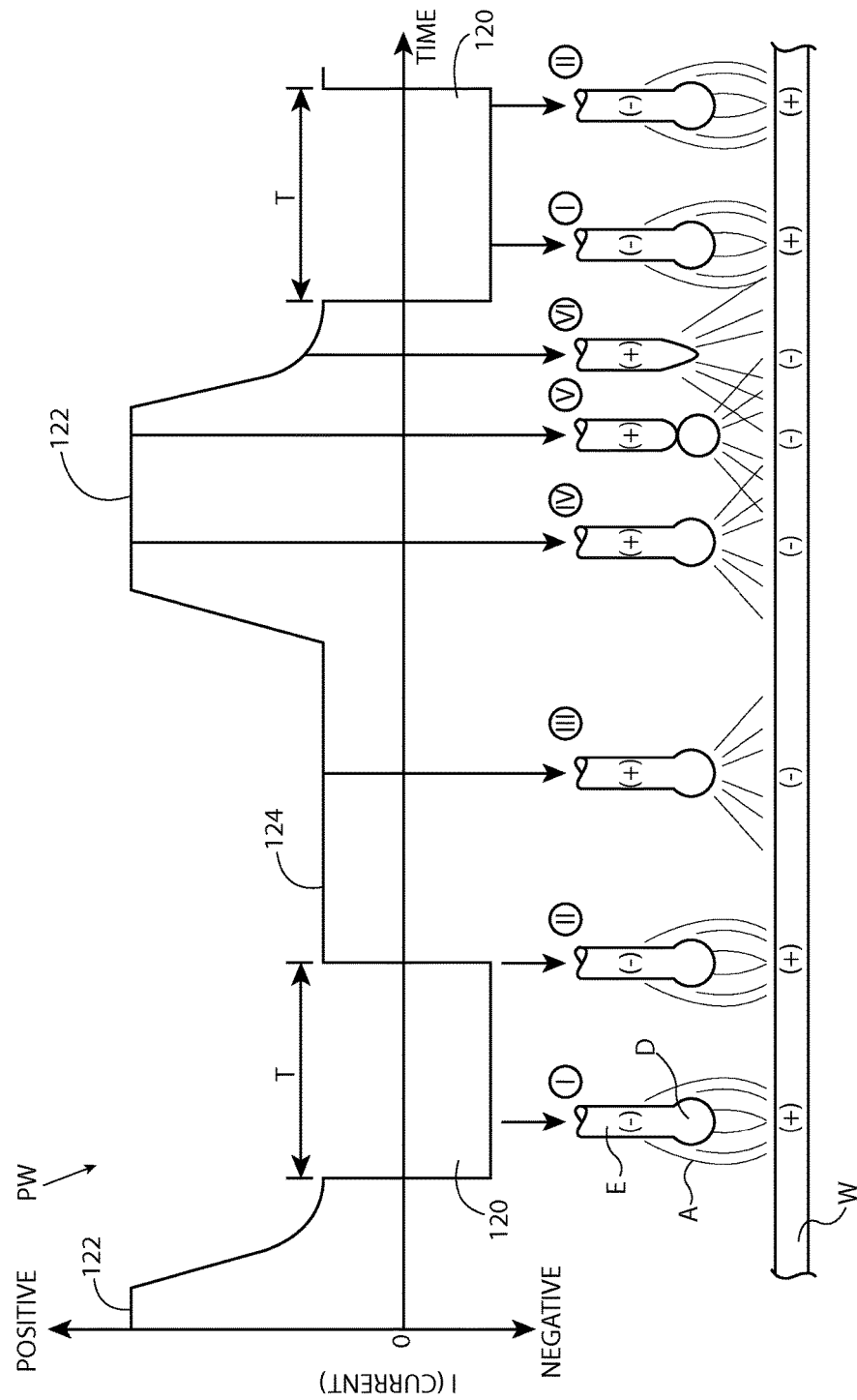
FIG. 5 is an exemplary current graph illustrating the high frequency pulses and negative polarity components along with exemplary droplet states.

FIG. 5 depicts an exemplary pulse wave PW in accordance with an exemplary embodiment of the present invention. In particular, FIG. 5 shows a simplified welding waveform or pulse wave PW with a negative polarity component 120, along with drawings of the various stages of electrode E droplet formation and deposition onto workpiece W, labeled as roman numerals I-VI. FIG. 5 shows a complete welding cycle of a pulse wave PW, where the waveform cycle has a peak pulse portion 122, a negative polarity portion 120, and a background portion 124. In the embodiment shown, the peak pulse portion 122 is the portion of the waveform cycle having the maximum current level for the pulse wave PW cycle, and typically represents the droplet transfer portion of the pulse wave PW. In typical pulse welding waveforms, a peak portion 122 and a background portion 124 may be combined such that a waveform alternates only between peak pulse portions 122 and background portions 124. In such embodiments, the background portion 124 is used to begin the melting of the electrode E to form a molten droplet, prior to the peak portion 122. In these embodiments, the end of the electrode E starts to form a relatively small droplet. A small amount of initial melting can be disadvantageous in some welding applications. Furthermore, an increase of current in the end of electrode E (to increase melting) before the peak pulse portion 122 may not be desirable because of the additional energy and heat ultimately input into the workpiece W during this process. Thus, embodiments of the present invention employ current pulse waves PW that have a negative polarity portion 120, for example, between the peak pulse portion 122 and the background portion 124. For simplicity, the embodiments shown in the drawings utilize current regulation, including for defining the negative polarity portion 120, peak pulse portion 122, and the background portion 124. In other embodiments, the pulse PW can also be regulated with voltage, or combinations of voltage and current to define the portions of the pulse wave PW, including, for example, the negative polarity portion 120, peak pulse portion 122, and the background portion 124.

As shown in FIG. 5, an exemplary pulse wave PW includes a negative polarity portion 120 after the peak pulse portion 122. As shown at I, because the flow of current is in the opposite (negative) direction, the arc A has a different shape or profile than during the other polarity (positive). Specifically, as mentioned above in relation to FIG. 4, with a negative polarity, the current creates an arc A which envelopes more of the electrode E, rather than being focused out of the end of the electrode E. By extending the arc A up the electrode E, more surface area of the electrode E is heated and thus more heat is input into the electrode E, without increasing the current. Because of this, the melting of the end of the electrode E is increased and a much larger molten droplet D is created at the end of the electrode E, as shown at II. Further, this larger droplet D is created: 1) without an increase in energy usage by the welding power supply; and 2) with less heat transferred into the workpiece W. As shown at III and IV, following the negative polarity portion 120, the background portion 124 is implemented, followed by the peak pulse portion 122. The affect of the complete pulse peak portion 122, effectively transferring droplet D to workpiece W, is shown in roman numerals IV through VI, after which the negative polarity portion 120 is repeated. Roman numerals IV and V depict the pinch force acting on the electrode E during transfer of the droplet D to the workpiece W. Embodiments employing a pulse wave PW with a negative polarity portion 120 are able to decrease the amount of energy needed to transfer a droplet D, increase the amount of consumable wire transferred per pulse cycle from the electrode E, and/or decrease the amount of heat transferred to the workpiece W.

In other embodiments, the sequence of the various portions of the pulse wave PW may be different. For example, the background portion 124 may precede the negative polarity portion 120. Further, it is noted that in some exemplary embodiments of the present invention, it is not necessary for the negative polarity portion 120 to be timed immediately after the peak pulse portion 122 or immediately before the background portion 124, but an intermittent current portion can be inserted in between these portions. In these embodiments, this intermediate current portion may be at the current level of the background portion 124 and may have a relatively short duration. In other embodiments, the current level at this intermediate portion may be lower than the background portion 124 to allow for better switching of the polarity of the current. The duration of the intermediate portion could be any duration that does not interfere with the creation and transfer of the droplet D to the workpiece W.

FIG. 5 shows an embodiment of the present invention where the magnitude of the current during the negative polarity portion 120 has the same magnitude as the background portion 124, but has an opposite polarity. However, in other exemplary embodiments of the present invention, the current during the negative polarity portion 120 can have a magnitude which is different than that of the background portion 124.

In addition, the exemplary pulse wave PW shown in FIG. 5 is shown with negative polarity portions 120 having the same duration T. The negative polarity portion 120 can build the droplet D on the end of the electrode E very quickly. Inconsistent durations T could result in inconsistent droplet D sizes because more or less time would allow more or less energy to be absorbed by the electrode E, which directly impacts the size of the droplet D formed and the ability of the pulse peak 122 to transfer that droplet D. More energy absorbed by the electrode E during a negative polarity portion 120 would result in a larger droplet D.

Although not shown in FIG. 5, variations in arc length or voltage can also affect the amount of energy absorbed by the electrode E during a negative polarity portion 120. Even if the magnitude of the current and the duration T during the negative polarity portion 120 are maintained, variations in voltage will result in droplet D size variation. In particular, an increase in the arc length or gap g will result in an increase in voltage to maintain the current through the arc. Like an increase in duration T, an increase in voltage during the negative polarity portion 120 results in more energy absorbed by the electrode E and a larger droplet D. The peak pulse portions 122 following the formation of the droplets D must be large enough to transfer the largest possible droplet D expected, even if the actual droplet is smaller. Inconsistent droplet D sizes results in inconsistent droplet transfers because the peak pulse portion 122 is not optimized for transferring droplets of different sizes. Adaptive control methods are inadequate to adjust for these conditions because they typically look at the long term running average of the waveform and the size of any particular droplet D can vary from cycle to cycle.

It has been determined that the size of a droplet D is directly proportional to the energy absorbed by the electrode E during the negative polarity portion 120. Based on feedback from or about the arc at the gap g, the amount of energy absorbed during the negative polarity portion 120 can be determined by calculating the integral of power during the negative polarity portion 120 as follows:

$$\int[\text{power during portion 120}] = \int[(\text{current during portion 120})*(\text{voltage during portion 120})]$$

In reference to the welder of FIG. 1, for example, for feedback about the arc at the gap g, the measurements $I_a$ and $V_a$ (via signals 52a, 54a) are available to the wave shaper 80:

$$\int[\text{power during portion 120}] = \int[I_a * V_a \text{ during portion 120}]$$

Calculating the integral of power during the negative polarity portion 120 allows the welder, e.g., via the wave shaper 80, to reliably control the size of the droplet D formed during the negative polarity portion 120 of the pulse wave PW, including during variations in arc length or voltage. In particular, the negative polarity portion 120 of FIG. 5 with duration T may be replaced with a control system that ends the negative polarity portion when the desired energy has been absorbed by the electrode E, as determined by the integral of power during the negative polarity portion.

Figure 6:
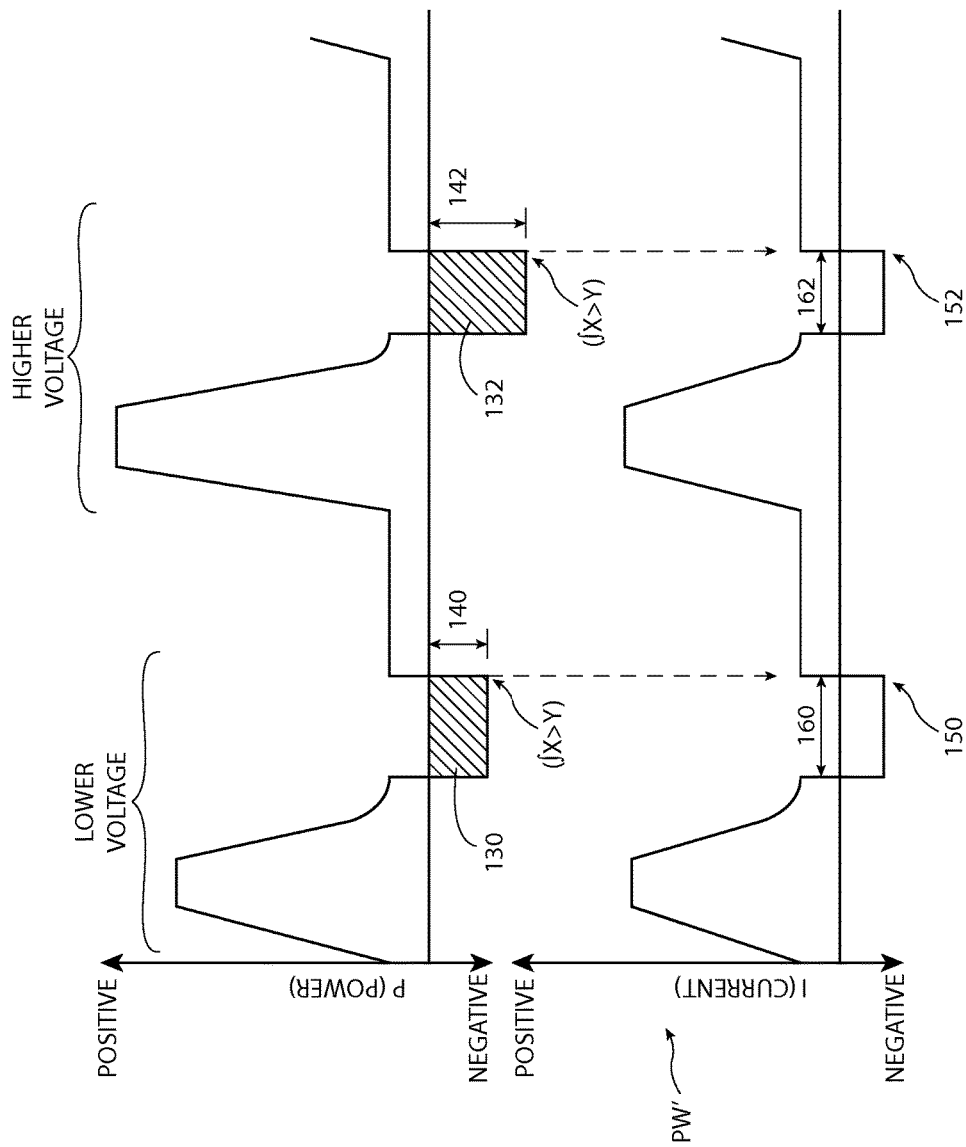
FIG. 6 is an exemplary power graph and current graph illustrating the high frequency pulses and negative polarity components.

FIG. 6 shows a current-regulated embodiment and an exemplary power graph along with an associated exemplary current graph of pulse wave PW'. As mentioned above, in other embodiments, voltage or combinations of voltage and current may also be regulated to define a pulse wave. The graph of power includes a lower voltage portion and a higher voltage portion, which may be caused by, for example, variations in arc length or gap g. As shown in FIG. 6, negative power portions 130, 132 have different magnitudes 140, 142, respectively. In particular, negative power portion 130 is associated with a relatively lower voltage and has a lower power magnitude 140. In contrast, negative power portion 132 is associated with a relatively higher voltage and has a higher power magnitude 142. Because the power has a greater magnitude during the higher voltage portion, a droplet D on electrode E would form faster by absorbing energy faster during the higher voltage portion.

By integrating power during the negative polarity portion of the waveform, energy absorption of the electrode E and droplet D can be determined and managed. To ensure that droplet D sizes are maintained at a desired size or "set point", even during variations in voltage, negative polarity portions can be stopped when a desired energy level or joule level, for example, as measured by integrating power, has been reached. For example, negative polarity portions associated with higher voltages (e.g., 132) are ended sooner than negative polarity portions associated with lower voltages (e.g., 130). Referring to FIG. 6:

X=power in watts ($I_a * V_a$);
∫X=total energy in watt*seconds or joules; and
Y=desired energy in joules that correlates to the desired droplet D size.

As shown in FIG. 6, the actual energy level ∫X reaches the desired energy level Y after different durations of negative polarity portions 160, 162 due to the differences in voltage during these portions. When ∫X reaches the desired energy level Y, the negative polarity portion of the pulse wave PW' is stopped at 150 after duration 160 during the lower voltage portion and at 152 after duration 162 for the higher voltage portion. Thus, the droplets D formed on the electrode E during the lower and higher voltage portions will be the same size. In this manner, the negative polarity portion of the pulse wave PW' is stopped when the droplet D has reached the desired size, regardless of voltage (and current) variations.

In other embodiments, a voltage calculation may also be used to determine when the droplet D has reached the desired size. For example, the integral of voltage may be used when the current is known.

In exemplary embodiments of the present invention, the duration of the negative polarity portion can range from, for example, 100 microseconds-20 milliseconds. In other exemplary embodiments, the negative polarity portion has a duration which is in the range of, for example, 0.3% to 50% of the welding cycle.

Figure 7:
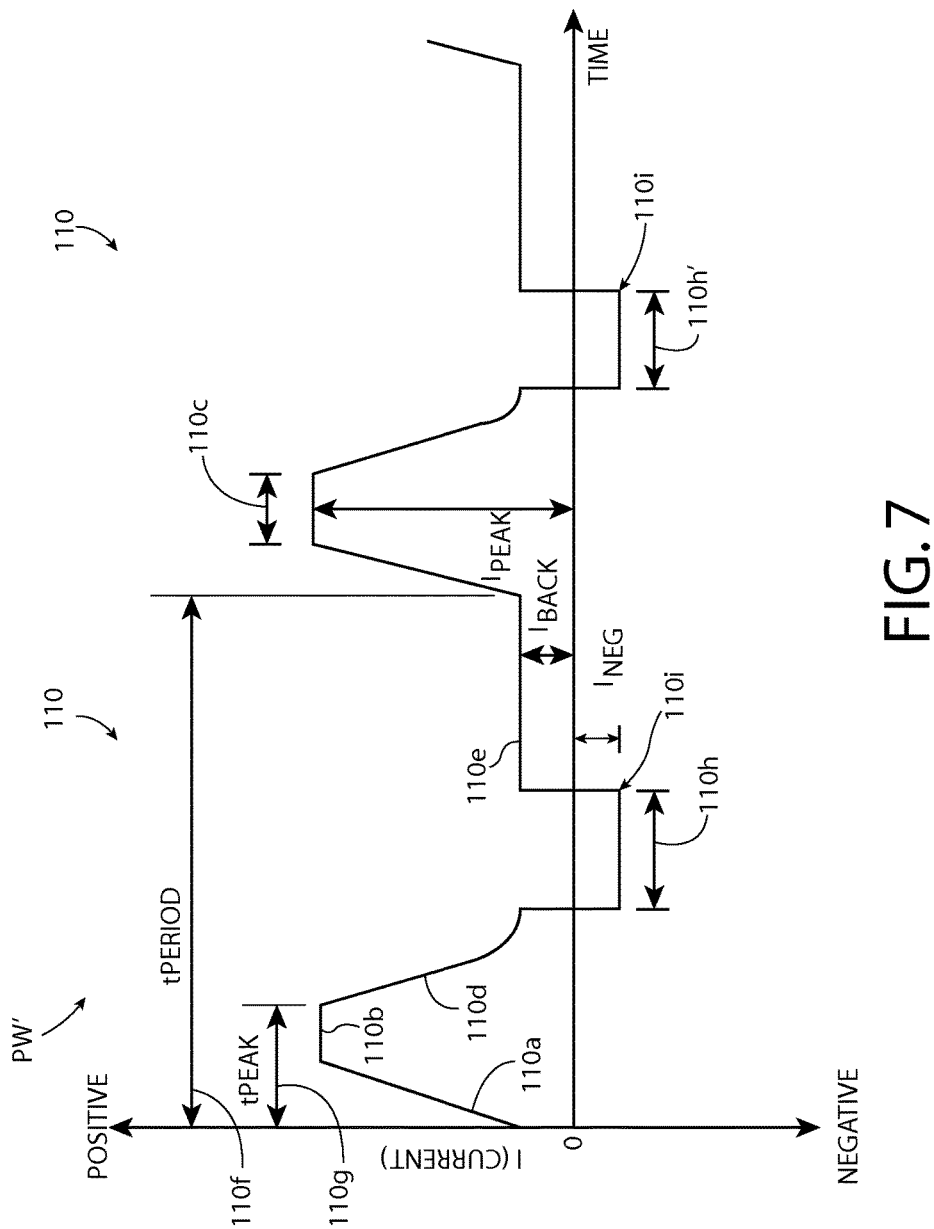
FIG. 7 is an exemplary current graph illustrating exemplary features of the high frequency pulses and negative polarity components used in an embodiment of the present invention.

The pulse wave PW' current graph shown in FIG. 7 is an exemplary embodiment achieved by having wave shaper 80 control the welding cycle with current regulation. The particular shape of the pulse wave PW' is defined by waveform features of the control logic 90, shown in FIG. 8. These features include positive and negative polarity portions of the waveform, which are achieved by utilizing the variable polarity switch 16 via control lines 55, 56 (discussed above). Similar pulse waves are achieved in other embodiments with voltage or a combination of current and voltage regulation.

Exemplary pulses 110 of the embodiment shown in FIG. 7 are created by wave shaper 80 at a frequency in the range of 20-400 Hz. For example, this frequency can be selected in an effort to optimize the pulse rate with the droplet rate of the molten aluminum. The pulse rate contributes to the heat of the weld and the heat in the weld puddle. These two aspects may be coordinated. Each pulse has a ramp up portion 110a with a controlled slope, a peak current ($I_{PEAK}$) 110b, which is the same for all pulses shown, a peak time portion 110c, which is the time that the current level is at a peak, a ramp down portion 110d, a negative current ($I_{NEG}$) portion for a negative portion time 110h, and a background current ($I_{BACK}$) portion 110e, which, when not interrupted by a pulse or negative current component, is constant. The ramp up time 110a is included in the peak time 110g. Although the peak current 110b, peak time 110g, and the period 110f remain the same, the amount of time that the pulse is at the peak current ($I_{PEAK}$) 110b is dictated by the slope of the ramp up portion 110a. Although not shown in FIG. 7, the shape of the negative polarity components may also include various slopes associated with the ramp down to the negative current ($I_{NEG}$) and the ramp up from the negative current. In addition, a negative polarity portion may be introduced anywhere in the pulse wave PW'. As discussed above, the duration of the negative portion 110h may vary to account for variations in power. FIG. 7 shows different negative portion times 110h, 110h' to represent the variability of negative portion times within the pulse wave PW'.

As shown in FIG. 8, exemplary control logic 90 is provided to create the exemplary pulse wave PW' of FIG. 7. Control logic 90 may be embodied, for example, as logic, software, or a sub routine, and may utilize a data table to define its operation. For example, as described in more detail below in association with FIG. 13, workpoints may be established for different specified wire feed speeds WFS, for example, that define features of the pulse wave PW', which are optimized for that wire feed speed WFS. Various other features may be used as the basis of any particular workpoint. The logic may be embodied in a software program, such as, for example, Lincoln Electric's Weld Development logic program, which is a state-based logic tree specifically for welding. Like other state-based programs, the logic may be in a state, running a function, say output current at 300 amps, until a conditional check becomes true (e.g., the peak timer >=2 milliseconds) and then the logic branches to the next state (defined in the conditional check). These state changes can occur very quickly, stringing together relatively complex logic without having to hard program the routine or change a PC board.

In FIG. 8, exemplary logic 90 is defined by steps 124, 126, 128, 129, and 130. The pulse has a ramp up current with a slope that terminates at time tR1, as shown by step 124. Then the peak current portion P1 is implemented until time tP1, as shown at step 126. Thereafter, there is an exponential decay at a speed 1 until time tS1, as shown by step 128. Then the negative current N1 is implemented until ∫X reaches the desired energy level Y, as shown at step 129, where X is the power in watts ($I_a*V_a$) during the negative current N1 and Y is the desired energy in joules that correlates to a desired droplet D size. The time when ∫X>Y is tN1, i.e., when the negative current N1 ends. Time tN1 may vary from cycle to cycle as the time that it takes to reach the desired negative energy (Y) varies, as discussed above, for example, due to voltage variations. Background current B1 is maintained until time tB1, as indicated by block or step 130. For example, tB1=$t_{PERIOD}$−tR1−tP1−tS1−tN1, i.e., the time left over after the other pulse parameters have been implemented. As mentioned above, the background current is maintained constant throughout the welding process embodiment shown in FIG. 7. Although blocks 124, 126, 128, 129, and 130 are shown in a particular order to represent the pulse profile or pulse wave PW' shown in FIG. 7, the features represented by these blocks are not limited to this sequence or configuration. Many other combinations of these features may be used to form various pulse wave PW and weld cycle profiles. For example, blocks 129 and 130 may be reversed, such that the pulse wave PW created by logic 90 employs the background current B1 before the negative current N1. In addition, other ramp up or ramp down features may be integrated into the pulse wave PW, for example, with the negative current N1.

Figure 9:
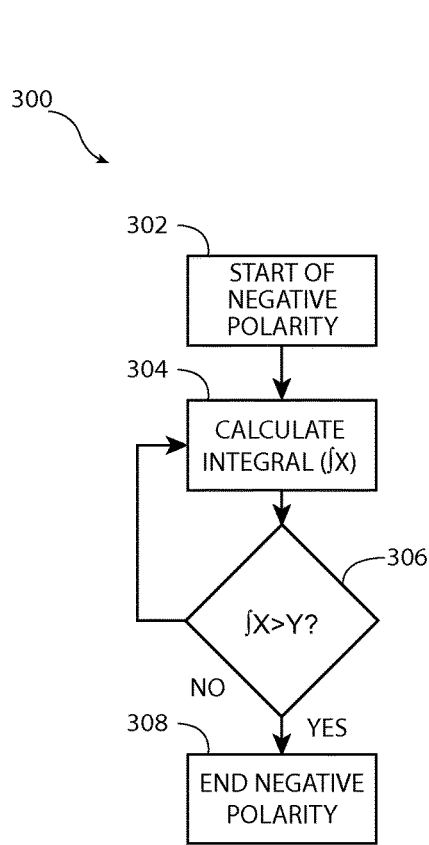
FIG. 9 is an exemplary logic diagram and flow chart to determine the end of an exemplary negative polarity component.

As discussed above, various calculations may be used to determine when the negative polarity portion has resulted in a negative energy level (Y) associated with a desired droplet D size. For example, the integral of voltage may also be used when the current is known. FIG. 9 illustrates exemplary logic 300, which may be a sub routine of block 129, for example, as shown in FIG. 8, to determine when to end the negative polarity portion or current N1 based on an integral calculation. At step 302, the negative polarity portion starts. As shown by step 304, during the negative current N1, the logic 300 calculates the integral of a measured parameter X that is indicative of the energy contributing to the size of droplet D. For example, as discussed above, X may be power (specifically discussed in more detail below in association with FIG. 10) or voltage during a known current. At step 306, the logic 300 compares the integral of X (∫X) to a predetermined desired energy value Y that corresponds to an amount of energy associated with a desired droplet D size. If ∫X has not yet reached Y, the logic 300 continues to calculate ∫X in step 304 and compare ∫X to Y in step 306 in a loop until ∫X reaches Y. When ∫X reaches Y, i.e., the desired energy level associated with the desired droplet D size has been reached, the logic 300 ends the negative polarity or negative current N1.

Figure 10:
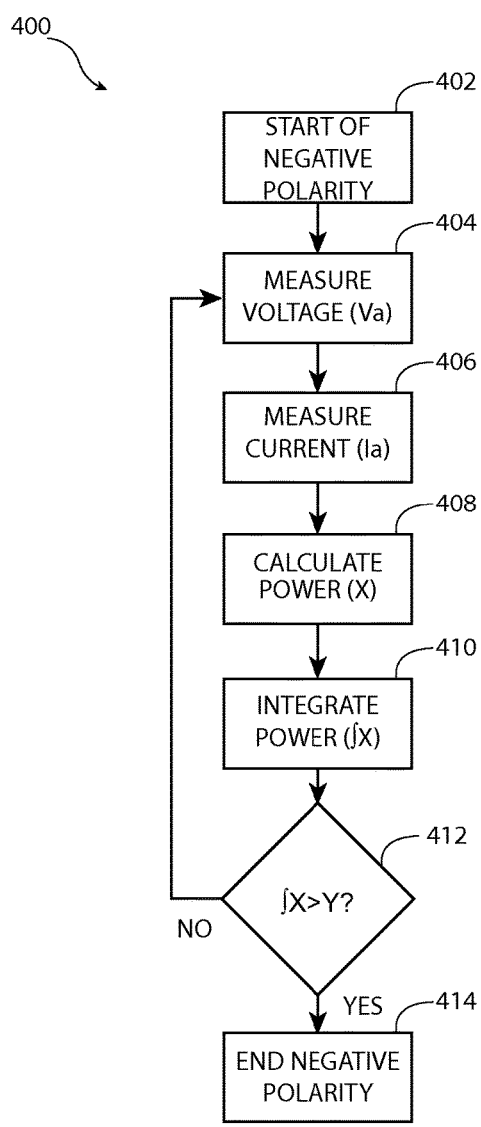
FIG. 10 is another exemplary logic diagram and flow chart to determine the end of an exemplary negative polarity component.

In one embodiment, as discussed above, X is the power in watts ($I_a*V_a$) during the negative current N1. FIG. 10 illustrates exemplary logic 400, which may be a sub routine of block 129, for example, as shown in FIG. 8, to determine when to end the negative polarity portion or current N1 based on an integral of power calculation. At step 402, the negative polarity portion starts. At step 404, during the negative current N1, the logic 400 measures the voltage ($V_a$), for example, via signal line 54a shown in FIG. 1. At step 406, the logic 400 measures the current ($I_a$), for example, via signal line 52a shown in FIG. 1. At step 408, the logic 400 calculates power X by multiplying the current and the voltage ($I_a*V_a$). As shown by step 410, the logic 400 calculates the integral of power X. At step 412, the logic 400 compares the integral of power X (∫X) to a predetermined desired energy value Y that corresponds to an amount of energy associated with a desired droplet D size. If ∫X has not yet reached Y, the logic 400 continues to measure voltage $V_a$, measure current $I_a$, calculate power X, and calculate ∫X in steps 404 through 410, and compare ∫X to Y in step 412 in a loop until ∫X reaches Y. When ∫X reaches Y, i.e., the desired energy level associated with the desired droplet D size has been reached, the logic 400 ends the negative polarity or negative current N1.

Figure 11:
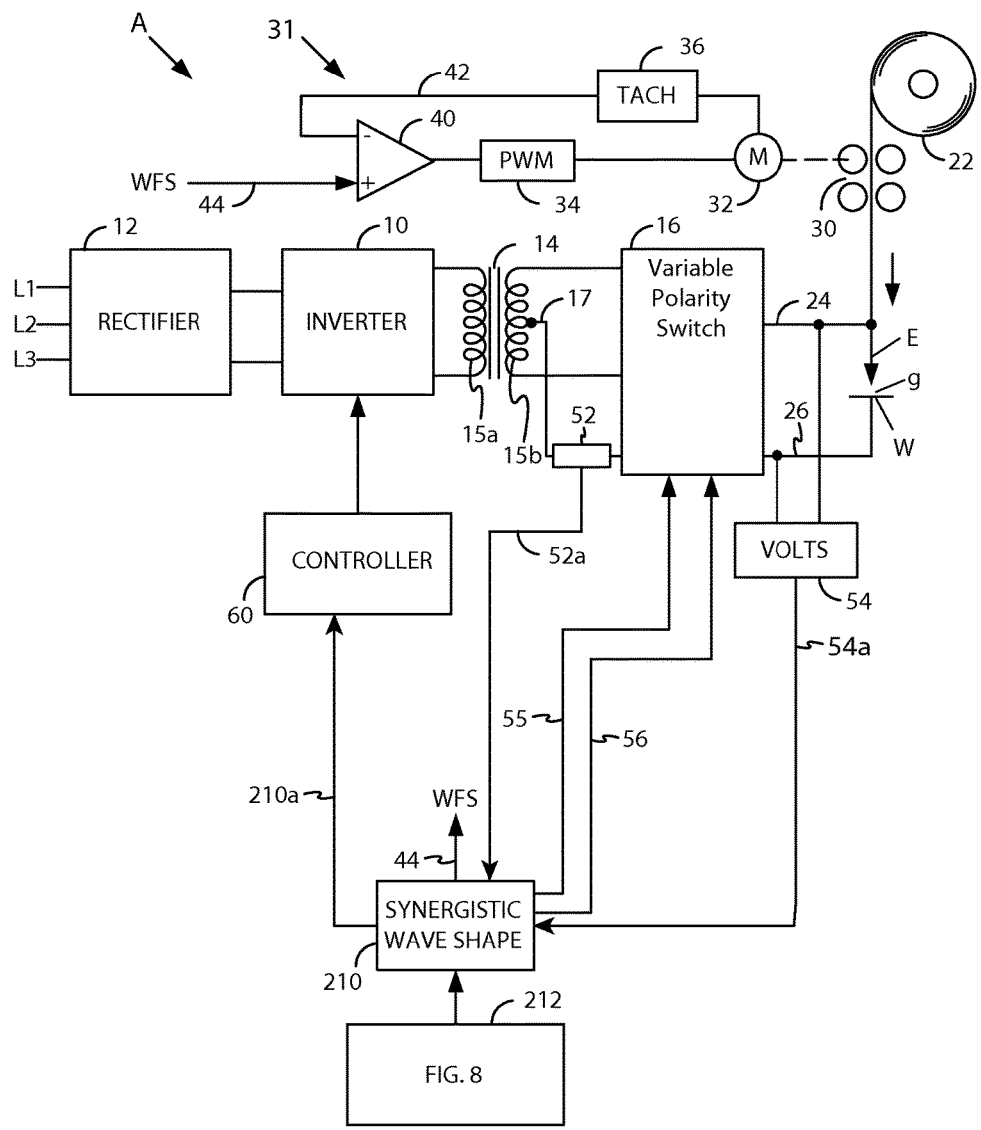
FIG. 11 is another exemplary combined block diagram and system architecture for an exemplary welder for performing an embodiment of the present invention.

A further modification of the invention is illustrated in FIG. 11, wherein a "synergistic" control action is implemented by wave shaper 210. The pulses created by this embodiment may be the same as those shown in FIG. 7, but may also include other wave forms or cycles. As mentioned above, the pulses of a cycle include a negative current that ends when a desired energy level is reached. The previously described circuitry to obtain this wave shape is schematically represented as block 212, where 212 can include a look up table with workpoints including various WFS parameters (as shown, for example, in FIG. 13, and described in more detail below). As shown in FIG. 11, welder A has the components described in connection with FIG. 1 and includes a wire feeder 30 so that wire E is fed into the welding operation in accordance with the level of the WFS signal on line 44. FIG. 11 includes the exemplary motor controller 31, as shown in FIG. 2, but may also utilize any other suitable motor controller. In addition to the control described in relation to FIG. 1 above, wave shaper 210 controls the signal on line 44 so it may have different levels associated with different wire feed speeds. Consequently, the modification shown in FIG. 11 adds to the previously described embodiment by outputting a voltage level on line 44 that tracks the energy level being processed by the welder A and coordinates the WFS accordingly. In this manner, there is a synergistic effect between the welding energy and the wire feed speed WFS of electrode E.

Figures 12, 13:
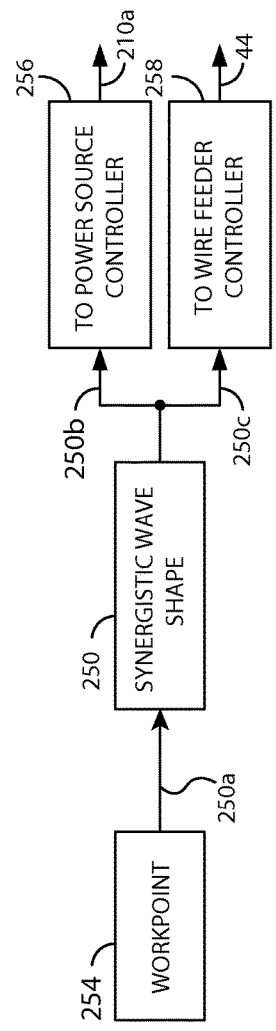
FIG. 12 is an exemplary block diagram showing an exemplary wave incorporating an exemplary workpoint.
FIG. 13 is an exemplary look up table including workpoints.

For example, other embodiments utilizing the concepts employed in the present invention are illustrated in FIGS. 12 and 13. In this embodiment, various parameters, including, for example, wire feed speed (WFS), peak current, peak time, negative current, negative energy, and background current, may vary from one workpoint to another. In this embodiment, as shown in FIG. 12, a synergistic wave shaper 250 is employed to process a workpoint 254 from look-up table 252 in accordance with the value of the input signal represented by line 250a. FIG. 12 shows a subset of exemplary workpoints and their associated exemplary parameters, which may not correspond to the parameter values shown in the referenced figures. The workpoint represented by the level of the signal on line 250a is output in accordance with the look-up table 252. The pulse features and wire feed speed WFS for a selected workpoint are used to control the shape of the pulse by controller 256 and the wire feed speed by controller 258. For example, the pulse shapes as shown in FIG. 7 may be implemented by the wave shaper or controller 256 by a signal on line 210a. Coordinated with the power source signal 210a is a WFS signal on line 44 as directed by controller 258. The wave shaper 250 produces a wave shape and a wire feed speed determined by the workpoint of look-up table 252. The workpoint 254 for the welder is input to the wave shaper 250 by input line 250a and output lines 250b, 250c provide signals to the power source controller 256 and wire feeder controller 258, respectively.

For example, in one embodiment, a workpoint 254 may generate an output on line 210a from the look-up table 252 for pulses having a shape as indicated by pulses 110 in FIG. 7. At the same time, the output on line 44 from the look-up table 252 produces a WFS signal corresponding to the pulses 110. The pulses 110 and the wire feed speed WFS are controlled together. In accordance with this embodiment, the workpoint from table 252 may be changed during each weld cycle, for example, to accommodate various welding applications and operating conditions. In other embodiments, the workpoint parameters may implement other welding techniques, such as, for example, shifting between high energy portions HP and low energy portions LP as described in U.S. Ser. No. 13/788,486. Although the look-up table of FIG. 13 includes current values, other embodiments may include look-up tables with other parameters, such as, for example, voltage values for embodiments utilizing voltage or a combination of current and voltage regulation.

The embodiments described above may be applied to various other welding techniques, such as, for example, short detection and clearing. In pulsed welding processes, the molten droplet D breaks free of the tip of the electrode E and "flies" across the arc toward the workpiece W. However, when the distance between the tip of the electrode E and the workpiece W is relatively short, the droplet D flying across the arc can make contact with the workpiece W (i.e., short) while a thin tether of molten metal still connects the droplet D to the tip of the electrode E. In such a tethered free-flight transfer scenario, the thin tether of molten metal tends to explode, causing spatter, when the droplet D makes contact with the workpiece W, due to a rapid increase in current through the tether.

In accordance with an embodiment of the present invention, the controller 60 and/or wave shaper 80 may use the sensed voltage signal 52a, the sensed current signal 54a, or a combination of the two to determine when a short occurs between the advancing electrode E and the workpiece W, when a short is about to clear, and/or when the short has actually cleared, during each pulse period. Such schemes of determining when a short occurs and when the short clears are well known in the art, and are described, for example, in U.S. Pat. No. 7,304,269 and U.S. Ser. No. 13/293,112, which are incorporated herein by reference in their entirety. The controller 60 and/or wave shaper 80 may modify the waveform signal when the short occurs and/or when the short is cleared. For example, when a short is determined to have been cleared, the controller 60 and/or wave shaper 80 may incorporate a plasma boost pulse in the waveform signal to prevent another short from occurring immediately after the clearing of the previous short.

Figure 14:
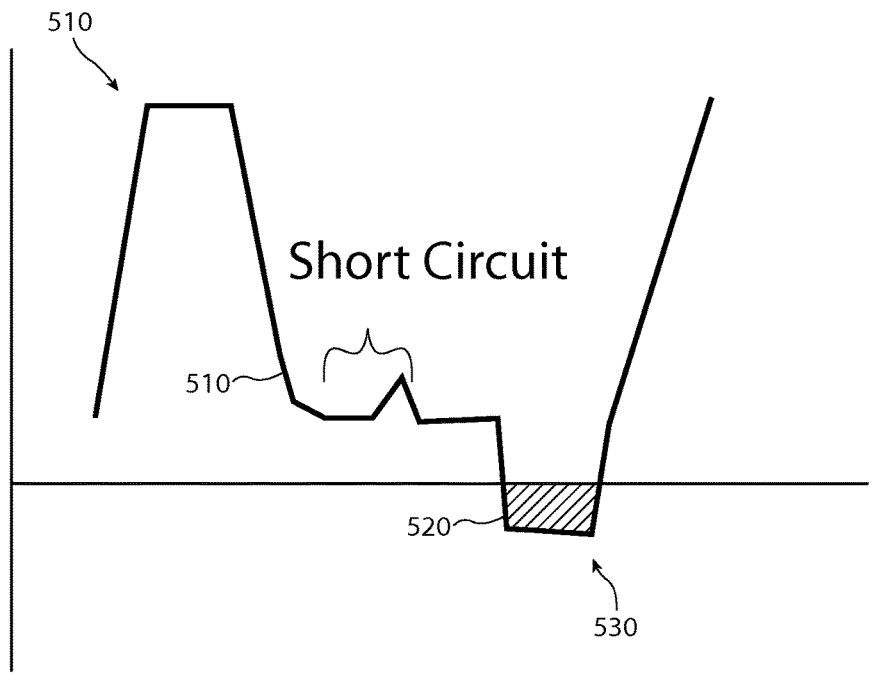
FIG. 14 is an exemplary waveform graph illustrating an exemplary short circuit and a subsequent negative polarity component.
Figure 15:
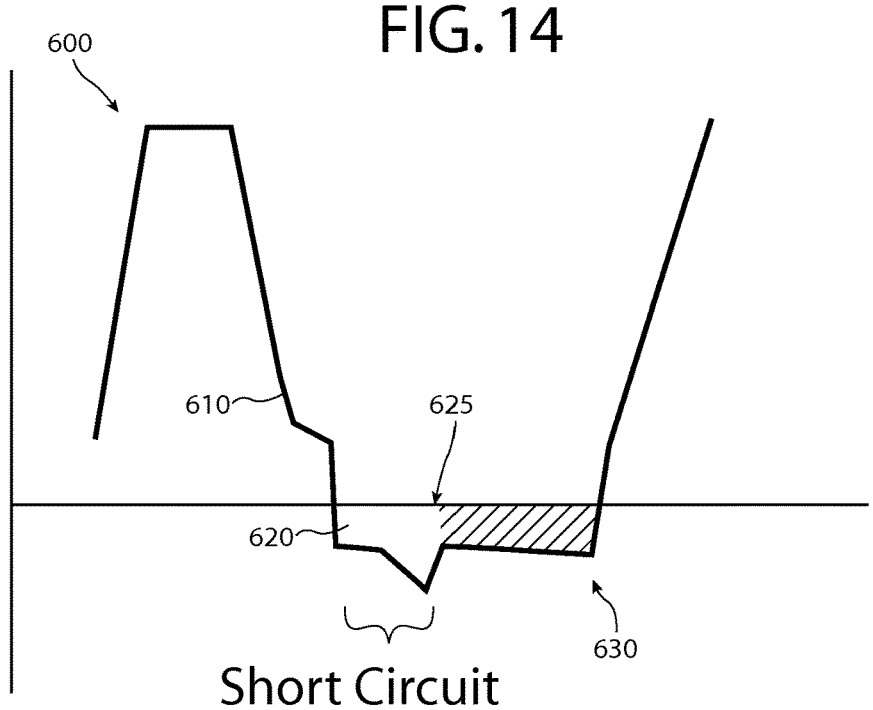
FIG. 15 is another exemplary waveform graph illustrating another exemplary short circuit and another subsequent negative polarity component.

FIGS. 14 and 15 show exemplary waveform graphs of pulses that show the incorporation of the embodiments described above with short circuits. As shown in FIG. 14, an exemplary waveform 500 with an exemplary short circuit occurs during or immediately after the exponential decay portion 510, but before the onset of a negative polarity portion 520. In this embodiment, the short circuit is cleared before the negative polarity portion 520 is initiated. After clearing the short circuit, the negative polarity portion 520 begins. In accordance with the techniques described in the above embodiments, an integral calculation (e.g., $\int X$) is used to determine when the negative polarity portion 520 has resulted in the desired energy (e.g., Y) associated with a desired droplet D size. Once the desired energy level is reached, the negative polarity portion 520 ends at 530. After ending at 530, the exemplary waveform may proceed, for example, to the next pulse peak (as shown in FIG. 14) or to a background current.

In another embodiment, as shown in FIG. 15, an exemplary waveform 600 with an exemplary short circuit occurs after the exponential decay portion 610 and at the onset or during a negative polarity portion 620. In this embodiment, the short circuit is cleared during the negative polarity portion 620. After clearing the short circuit, the negative polarity portion 520 continues. If an integral calculation (e.g., $\int X$) began before the short circuit, the calculation may restart at 625. In accordance with the techniques described in the above embodiments, the restarted integral calculation is used to determine when the negative polarity portion 620 has resulted in the desired energy (e.g., Y) associated with a desired droplet D size. Once the desired energy level is reached, the negative polarity portion 620 ends at 630. After ending at 630, the exemplary waveform may proceed, for example, to the next pulse peak (as shown in FIG. 15) or to a background current.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

The following is claimed:

1. An electric arc welder comprising:
   a high speed switching power supply configured to create high frequency pulses through a gap between a workpiece and a welding wire advancing toward the workpiece;

a voltage sensor configured to measure a voltage through the gap; and a wave shape generator to define a shape of the high frequency pulses and a polarity of the high frequency pulses, wherein the wave shape generator is configured to:
 start a negative polarity portion of a pulse wave,
 integrate the voltage measured across the gap by the voltage sensor during the negative polarity portion to determine an integrated voltage value during the negative polarity portion,
 compare the integrated voltage value to a threshold value, and
 end the negative polarity portion when the integrated voltage value reaches the threshold value.

2. The electric arc welder of claim 1, wherein the wave shape generator is further configured to:
 determine a power of the pulse wave during the negative polarity portion;
 integrate the power during the negative polarity portion to determine an integrated power value during the negative polarity portion;
 compare the integrated power value to a second threshold value; and
 end the negative polarity portion when either of the integrated voltage value reaches the threshold value or the integrated power value reaches the second threshold value.

3. The electric arc welder of claim 2, further comprising a current sensor configured to measure a current through the gap, wherein the wave shape generator is further configured to:
 determine the power based on the measured voltage and the measured current.

4. The electric arc welder of claim 2, wherein the integrated power value is a total energy generated at the gap during the negative polarity portion.

5. The electric arc welder of claim 2, wherein the integrated power value is associated with an energy generated on the welding wire during the negative polarity portion.

6. The electric arc welder of claim 1, wherein the wave shape generator is further configured to:
 determine a power of the pulse wave during the negative polarity portion; and
 compare the power to a second threshold value, wherein the second threshold value is associated with a wire droplet size.

7. The electric arc welder of claim 1, wherein a first duration of a first negative polarity portion of a first pulse cycle is different than a second duration of a second negative polarity portion of a second pulse cycle.

8. The electric arc welder of claim 1, further comprising a variable polarity switch responsive to the wave shape generator to control the polarity of the high frequency pulses.

9. The electric arc welder of claim 1, further comprising a wire feeder to feed the welding wire advancing toward the workpiece, wherein the wire feeder is responsive to the wave shape generator to coordinate a wire feed speed with the high frequency pulses.

10. The electric arc welder of claim 2, wherein the negative polarity portion includes a negative current component.

11. The electric arc welder of claim 2, wherein the negative polarity portion includes a voltage component.

* * * * *